United States Patent [19]
Sitton

[11] 3,985,097
[45] Oct. 12, 1976

[54] APPARATUS FOR COATING WORKPIECES WITH A PLASTIC MATERIAL

[75] Inventor: Willard J. Sitton, Houston, Tex.

[73] Assignee: ACF Industries, Incorporated, New York, N.Y.

[22] Filed: Dec. 31, 1974

[21] Appl. No.: 537,815

[52] U.S. Cl. .............................. 118/425; 118/429; 118/DIG. 5; 427/185
[51] Int. Cl.² ..................... B05C 3/05; B05C 19/02
[58] Field of Search .............. 118/425, 429, DIG. 5; 427/185, 182; 259/DIG. 43

[56] References Cited
UNITED STATES PATENTS

| | | | |
|---|---|---|---|
| 2,741,221 | 4/1956 | Weiskopf et al. | 118/425 |
| 2,844,489 | 7/1958 | Gemmer | 427/185 X |
| 3,020,877 | 2/1962 | Wallace | 118/425 X |
| 3,056,320 | 10/1962 | Findley | 259/DIG. 43 |
| 3,167,454 | 1/1965 | Tompson | 118/425 |
| 3,183,113 | 5/1965 | Gemmer | 118/429 X |
| 3,431,887 | 3/1969 | Pettigrew et al. | 118/425 X |
| 3,589,335 | 6/1971 | Harthman et al. | 118/DIG. 5 |
| 3,756,852 | 9/1973 | Scheetz et al. | 118/DIG. 5 |
| 3,804,375 | 4/1974 | Matson | 259/DIG. 43 |
| 3,839,918 | 10/1974 | Fischer | 259/DIG. 43 |

FOREIGN PATENTS OR APPLICATIONS

| | | | |
|---|---|---|---|
| 682,664 | 3/1964 | Canada | 427/185 |

OTHER PUBLICATIONS

Production Setups for Fluidized-Bed Coating, Reprinted from Modern Plastics, Jan. 1962.

*Primary Examiner*—James Kee Chi
*Attorney, Agent, or Firm*—Eugene N. Riddle

[57] ABSTRACT

Apparatus and method for coating workpieces in a fluidized plastic bed in which the workpieces are heated to a predetermined high temperature, then suspended from their upper ends and lowered into a container having a fluidized plastic coating material therein. A fixed support frame over the container has a vertically movable support thereon for the workpieces and a vibrator mounted adjacent the lower end of the vertically movable support vibrates the workpieces at a predetermined rate while the workpieces are supported in a suspended relation within the fluidized plastic bed.

5 Claims, 8 Drawing Figures

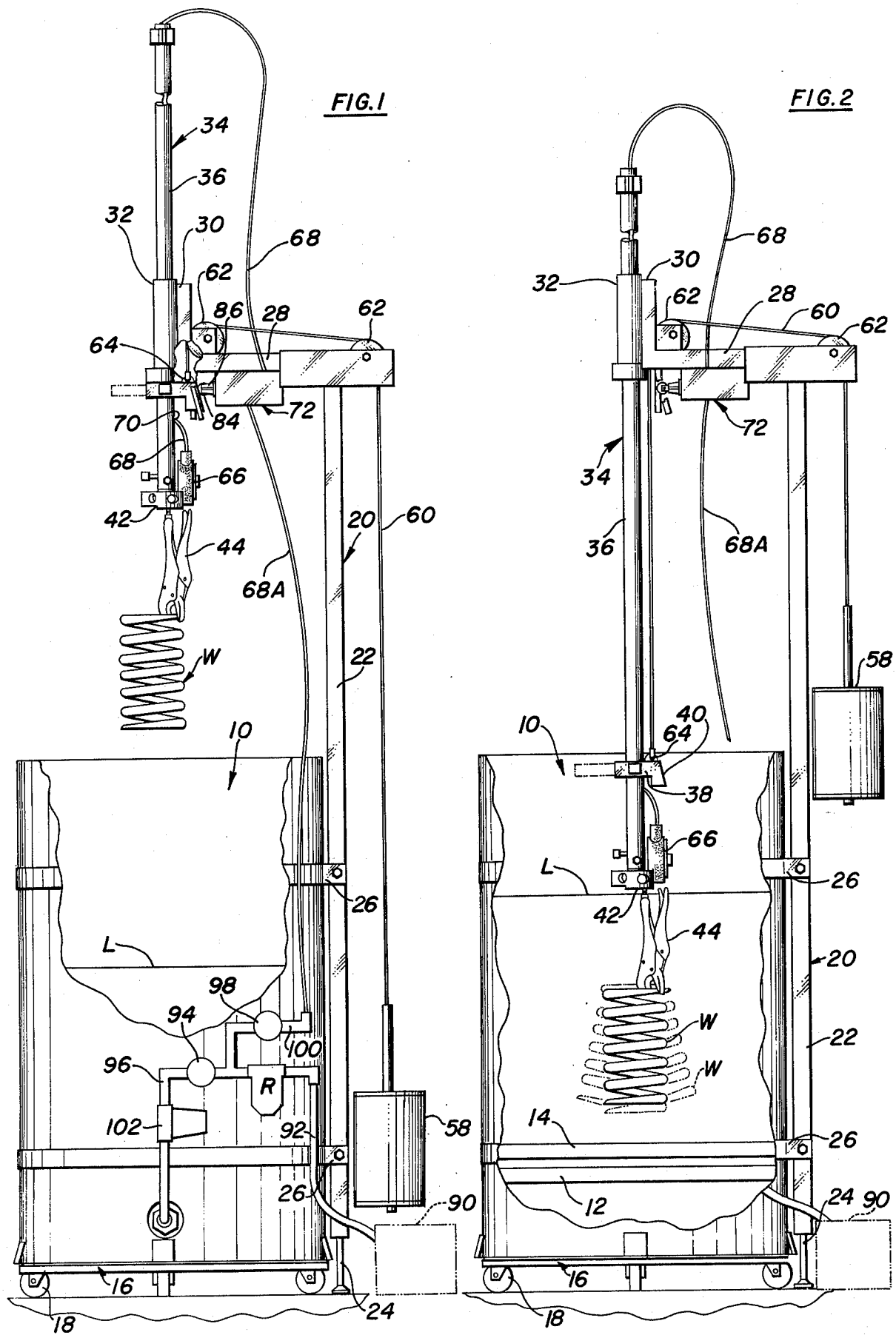

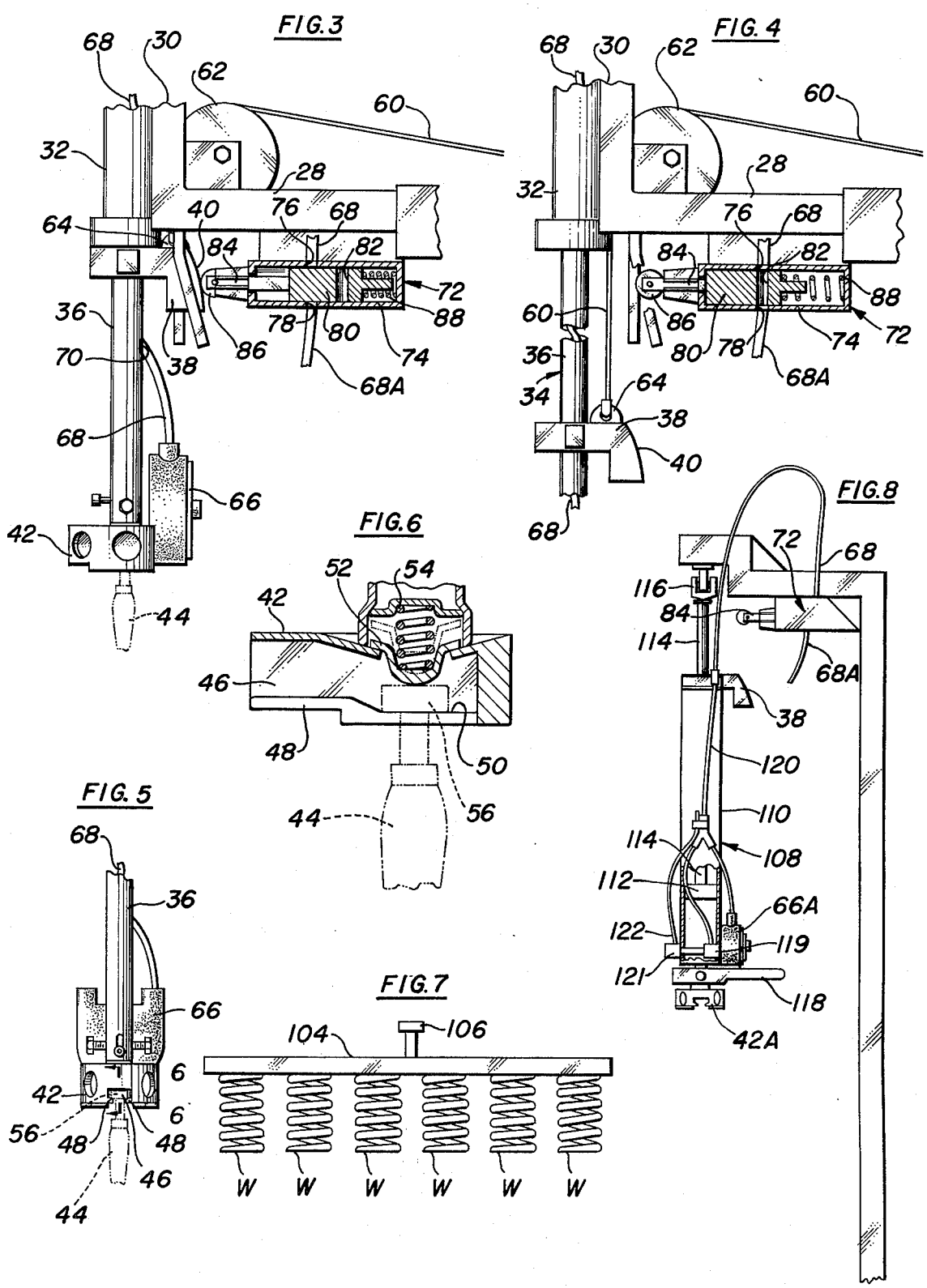

APPARATUS FOR COATING WORKPIECES WITH A PLASTIC MATERIAL

BACKGROUND OF THE INVENTION

Heretofore, workpieces have been positioned within an aerated or fluidized plastic bed and vibrated for a predetermined period of time in order to provide a plastic coating on the workpieces. The workpieces are usually heated to a predetermined high temperature before being lowered into the aerated plastic coating which may be formed of a corrosion-resistant powdered material, and the powdered material is melted by the heated workpiece. However, it has been difficult to provide a uniform plastic coating of a predetermined thickness, particularly with certain types of workpieces, such as coiled springs.

DESCRIPTION OF THE INVENTION

Apparatus for coating individual workpieces in a fluidized plastic bed by suspending the individual workpieces and lowering the workpieces after being heated into a container. A fixed support frame is provided over the container and a vertical support member is mounted for vertical movement on the fixed frame. A vibrator is carried by the lower end of the vertical support member and the workpiece is continuously vibrated while in the fluidized plastic bed at a rate of between around 8,000 vibrations per minute and 16,000 vibrations per minute. An air valve for the vibrator to control the actuation of the vibrator is mounted on the fixed frame and held in a closed position by cam means on the movable support member when in its uppermost position. Upon movement of the vertical support member from its uppermost position the air valve is opened to supply air to the vibrator for vibrating the lower portion of the support and the workpieces while the workpieces are suspended in the aerated fluidized bed. Upon movement of the vertical support to its uppermost position and removal of the workpieces from the fluidized bed, the air valve is cammed to a closed position by a cam carried by the vertical support thereby to shut off the supply of air to the vibrator. The workpieces are preheated before being suspended from the lower end of the vertical support and the fluidized plastic particles are melted when contact is made with the preheated workpieces thereby to provide a coating over the outer surfaces of the workpieces. The vibration of the workpieces provides a uniform coating over all the surface areas of the workpieces except in the area where the workpieces are suspended which are relatively small areas and are manually covered with the corrosion-resistant material after the workpieces are removed from the fluidized bed.

BRIEF DESCRIPTION OF THE DRAWINGS

In the accompanying drawings in which several of the various possible embodiments of the invention are illustrated:

FIG. 1 is an elevational view of the apparatus for coating workpieces in a fluidized plastic bed within a container with an air supply means for fluidizing the plastic material and for supplying air to a vibrator for the workpieces, the apparatus being shown in a raised position of the workpieces;

FIG. 2 is an elevational view similar to the apparatus shown in FIG. 1 showing the apparatus in a lowered position of the workpieces with the workpieces being vibrated within a fluidized plastic bed within the container;

FIG. 3 is an enlarged fragment of FIG. 1 illustrating the air valve for the vibrator in section with a cam on the vertically movable support urging the air valve to a closed position;

FIG. 4 is an enlarged fragment similar to FIG. 3 but showing the air valve in an open position with the adjacent vertical support positioned downwardly from its uppermost position;

FIG. 5 is an elevational view of the means for suspending the workpiece from the vertical support;

FIG. 6 is a section taken generally along line 6—6 of FIG. 5 illustrating the supporting means for the workpieces;

FIG. 7 is an elevational view of a modified form of support means for suspending the workpieces in which a magnetic support is provided to suspend a plurality of workpieces therefrom; and FIG. 8 is an elevational view of a further modification in which an air cylinder is provided for raising and lowering workpieces.

Referring now to the drawings and more particularly to the embodiment shown in FIGS. 1–5, a container or tank is generally indicated at 10 and has a porous diffusible plate 12 therein. Diffusible plate 12 may be formed of a ceramic requiring a minimum air pressure to fluidize and having a generally uniform open-pore construction. Plate 12 is easy to clean and is of a high heat-resistant nature. Therefore, there is no damage or reduction in air passage through the ceramic plate 12 upon accidental contact from a hot workpiece or item.

An expanded metal grate 14 is positioned within tank 10 over plate 12 and will protect plate 12 in the event a heavy object or workpiece is dropped onto plate 12. Pumice stone may be provided beneath ceramic plate 12 and a powdered plastic compound is placed within tank 10 for fluidizing or aerating. The plastic compound is provided as a corrosion-resistant coating for a workpiece W which may be in the form of a coiled spring or the like, for example. The plastic compound is a 100% solids, powdered, unfilled epichlorohydrin bisphenol epoxy plastic compound formulated for use primarily in a fusion bond coating process. The coating after properly cured on a workpiece is hard but flexible to provide a high impact and thermal shock resistance while effecting good corrosion resistance particularly to dilute aqueous acids, hydrocarbons, petroleum solvents, grease, oils, water, steam and aqueous salt solutions, and vapors.

Container 10 may be mounted on a wheeled dolly generally indicated at 16 having wheels 18. A fixed frame indicated generally at 20 has a main vertical support member 22 carrying a spring mounted floor stop 24 adjacent its lower end. Suitable means (not shown) are provided to retract floor stop 24 as is well known. Vertical member 22 is secured by bands 26 extending about tank 10 and secured thereto for holding vertical member 22 in position. Adjacent the upper end of vertical support 20 is a horizontal cross member 28 having an integral vertical member 30. A tubular support 32 is secured integrally with vertical support 30.

Mounted on tubular support 32 for vertical sliding movement is a support frame generally indicated at 34 and comprising a vertical member 36 having a cross piece 38 mounted thereon. Cross piece 38 has a cam surface 40 adjacent one side thereof. The lower end of tubular vertical member 36 includes a releasable suspension support member 42 having a suspension tool or member 44 releasably mounted thereon and connected to workpiece W to hold workpiece W in a suspended position. As shown particularly in FIG. 6, releasable securing means 42 includes a slot 46 defined along its lower portion by a pair of opposed spaced guides 48 which form a guideway. Slot 46 has a depressed or lowered center portion 50 therein. A spring mounted catch 52 is positioned over depressed portion 50 and a spring 54 continuously urges depressible catch 52 in a downward position as shown in FIG. 6. Workpiece suspension member 44 has an upper enlarged end or head 56 which is adapted to fit within slot 46 and ride along the upper surfaces of guides 48 until it is positioned within depressed portion 50. Head 56 initially urges a releasable catch 52 to an upper position and when seated within lower center portion 50 spring 54 moves catch 52 downwardly against the upper surface of head 56 thereby to retain releasably head 56 within slot 46. Suspension tool 44 compresses a pair of vice clamps having jaws thereon which may grip the workpiece W upon suitable adjustment. It is to be understood that other types of securing means to grip the workpiece W in a suspended relation may be provided, if desired.

Movable frame 34 is movable manually between its uppermost position shown in FIG. 1 and a lower position shown in FIG. 2 in which workpiece W is positioned within the fluidized powdered material within tank 10. The level L of material in tank 10 is indicated in a fluidized position in FIG. 2 and in a non-fluidized position in FIG. 1. To move frame 34 downwardly, a workman may grip the securing means at 42 and manually pull frame 34 downwardly to the position of FIG. 2. A counterweight indicated at 58 has a cable 60 secured thereto. Cable 60 is directed around pulleys 62 mounted on fixed frame 20 and is anchored at 64 to cross member 38 of movable frame 34. Thus, upon downward movement of movable frame 34 counterweight 58 is lifted to the position of FIG. 2. Upon the upward movement of frame 34 from the position of FIG. 2 counterweight 58 aids in the raising of the frame 34 and workpiece W from tank 10.

Mounted adjacent the lower end of vertical member 36 is an air vibrator 66. An air line 68 is connected to air vibrator 66 and extends through an opening 70 in tubular vertical support 36 adjacent air vibrator 66 and then extends outwardly from an opening 70 in the upper end of vertical support 36. Air line 68 leads to an air valve generally indicated at 72. Air valve 72 as shown in FIG. 4 includes a body 74 having an air outlet opening 76 connected to air line 68 and an air inlet opening 78 connected to an air supply line 68A. A slide valve 80 within body 74 has a passageway 82 therein which is adapted to align with openings 76 and 78 in an open position of air valve 72. A stem 84 on slide valve 80 has a roller 86 mounted thereon and is movable with valve 80. A spring 88 continuously urges slide valve 80 and roller 86 toward an extended position in which passageway 82 is in alignment with openings 76 and 78 thereby to supply air to vibrator air line 68 and thence to vibrator 66 for inducing vibration in workpiece W. Upon downward movement of movable frame 34 from its uppermost position as shown in FIG. 1, cam surface 40 moves away from roller 86 and spring 88 urges slide valve 80 to an open position thereby to supply air to vibrator 66. Slide valve 80 acts as a plunger since it is continuously biased outwardly by spring 88.

An air supply such as indicated generally at 90 has a line 92 extending to a regulator R which may be adjusted to regulate the flow of air from air supply 90. A valve 94 controls the flow of air through a branch line 96 to the lower end of tank 10 which supplies air for aerating or fluidizing the powdered material within tank 10. A valve 98 controls the flow of air through branch line 100 which is connected to the supply line 68A extending to air valve 72. A water trap 102 may be provided in branch line 96 to insure that any moisture in the air provided to aerate the plastic powdered material in tank 10 is removed.

In operation, a workpiece W, such as a coiled spring, is first preheated to a temperature of around 400° and 450° F, for example, by placing within an oven or other suitable heating apparatus. Container 10 is approximately one-half full of the corrosion-resistant powdered plastic material as specified above and then the air pressure is turned on with the air regulator R maintaining the pressure between around ½ and 2 pounds per square inch. The plastic powdered material is aerated for around 2 minutes. Next, the suspension tool 44 comprising vice grips is clamped onto workpiece W and tool 44 is then positioned within slot 46 with head 56 resting in the depressed portion of the slot as shown in FIG. 6. In this position, support means 42 is manually gripped and movable frame 34 is moved downwardly until workpiece W is entirely immersed within the aerated powdered material. Upon movement of movable frame 34 from its uppermost position as shown in FIG. 1, air valve 72 opens to supply air to vibrator 66. Workpiece W is vibrated for 3 seconds while immersed within the plastic powder and then movable frame 34 is moved to its uppermost position thereby to close air valve 72 after contact of cam surface 40 with roller 86. Workpiece W may then be removed and allowed to cool. A coating of around 0.008 inch in thickness is provided onto the outer surface of workpiece W and the continuous vibration thereof for three seconds provides a uniform coating which is obtained in remote areas of workpiece W.

The spring or workpiece W after being removed from the tank 10 is then cured by placing into a suitable oven for preheating to around 400° F. After the preheating or curing for around 30 minutes, the workpiece W is then removed from the preheat apparatus and allowed to cool for around 2 hours. After workpiece W has cooled, the area of workpiece W on which the vice grips were contacting workpiece W are covered with a suitable epoxy compound comprising a suitable resin and hardener. This area may be brushed onto the workpiece W by a workman.

The vibration of workpiece W by air vibrator 66 while workpiece W is suspended within the fluidized plastic material provides a uniform thickness of coating onto workpiece W and it is necessary that workpiece W be vibrated at a predetermined rate for a predetermined amount of time in order to provide such a uniform coating. To obtain the coating having a thickness of around 0.008 inch, it has been found that a vibration rate between around 8,000 vibrations per minute and 16,000 vibrations per minute are provided for around 3 seconds. Such a vibration rate has been found to be very effective in obtaining a uniform coating on workpiece W while workpiece W is held in a suspended position and vibrated from its upper end portion while being gripped or supported thereby. The thickness of the desired coating on the workpiece may vary depending on the type of the workpiece and proposed use of the workpiece for example. However, it is believed that a thickness of the plastic material between around 0.002 inch and 0.020 inch would cover most commercial uses for workpieces similar to coiled springs. The thickness of the plastic coating varies directly with the amount of time the workpiece is immersed within the fluidized bed. To obtain a thickness of around 0.020 inch the workpiece would be immersed around 10 seconds and for a thickness of around 0.002 inch would be immersed around 1 second.

It is to be understood that various types of vibrators may be employed to provide the vibration rate. One type of vibrator which has been satisfactory is a Model BD, size 25M pneumatic vibrator manufactured by Martin Engineering Company, Neponset, Illinois and sold under the trademark "Vibrolator". This vibrator operates at an air pressure of 80 psi and has a ball bearing revolving about an outer race at a rate of 12,500 rpm and producing around 500 pounds of centrifugal force.

Referring now to FIG. 7, a separate embodiment is provided for suspending workpieces W from a support for immersion within container 10. A magnetic head generally designated at 104 has an upper support 106 which may be inserted within this slot in vertical support 42. In this manner a plurality of workpieces W may be magnetically suspended from head 104 while the plastic coating is being positioned on workpieces W.

Referring now to FIG. 8 in which a modified form of support for workpiece W is shown, a pneumatic lift-type apparatus is shown generally at 108 in which a pneumatic cylinder 110 has a piston 112 mounted therein and a piston rod 114 connected to piston 112. Piston rod 114 may be connected by a pivot at 116 to the fixed frame and air is continuously supplied from line 68 to the upper end of cylinder 110 to urge cylinder 110 downwardly. A manual control is indicated at 118 and upon a downward movement thereof, valve 119 is opened to supply air into the bottom portion of cylinder 110 beneath piston 112 through line 120 thereby to lower cylinder 110. When handle 118 is moved in an upward direction, valve 121 is opened and air is exhausted through line 122 from the lower portion of cylinder 110 beneath piston 112 and the air which is continuously supplied to cylinder 110 above piston 112 then raises cylinder 110 and workpiece W supported therefrom. Thus, an automatic type of control is provided which eliminates the need of a counterbalance or like means to aid in the manual movement of the vertically movable frame. Air for vibrator 66A secured to cylinder 110 may be supplied from line 120. A support 42A may be secured to the lower end of cylinder 110 for supporting the workpieces in a manner similar to the embodiment of FIGS. 1–6.

What is claimed is:

1. Apparatus for coating workpieces with a fluidized plastic material comprising a tank having a fluidized plastic coating material therein for coating workpieces therein which have been preheated to a predetermined high temperature, a fixed support frame extending over the tank, a vertically movable support mounted on the fixed support frame for movement between raised and lowered positions, means on the lower end of the movable support to releaseably suspend a workpiece thereon, a pneumatic vibrator secured to the lower end of said vertically movable support for vibrating said support and workpiece thereon when said workpiece is held in a suspended position within the fluidized plastic coating material within the tank, and means to supply air to said vibrator including an air valve positioned on the fixed support frame adjacent the movable support and having means in contact with the movable support in an upper position for maintaining the air valve in a closed position, the downward movement of said movable support from the upper position to a lower position releasing the air valve for movement to an open position to supply air to the vibrator from the supply means.

2. Apparatus for coating workpieces with a plastic coating material as set forth in claim 1 wherein said vertically movable support is manually movable and a counterweight is connected thereto to facilitate the movement of said vertically movable support.

3. Apparatus for coating a workpiece as set forth in claim 1 wherein said vertically movable support comprises a pneumatic cylinder and said vibrator is mounted on the lower end of said pneumatic cylinder.

4. Apparatus for coating a workpiece as set forth in claim 1 wherein said means on the lower end of the movable support comprises a support having a slot and guideway therein, and means securing the workpiece releasably fits within said slot and is guided by the guideway to its support position.

5. Apparatus for coating a workpiece as set forth in claim 4 wherein a releasable catch is provided for releasably securing the means supporting the workpiece.

* * * * *